(12) United States Patent
Granstam et al.

(10) Patent No.: US 6,587,691 B1
(45) Date of Patent: Jul. 1, 2003

(54) METHOD AND ARRANGEMENT RELATING TO MOBILE TELEPHONE COMMUNICATIONS NETWORK

(75) Inventors: Bo Granstam, Kållered (SE); Tomas Gabinus, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/512,376

(22) Filed: Feb. 25, 2000

(30) Foreign Application Priority Data

Feb. 25, 1999 (SE) ............................................ 9900710

(51) Int. Cl.[7] .............................................. H04Q 7/20
(52) U.S. Cl. .................... 455/456; 455/457; 455/524
(58) Field of Search ................................. 455/456, 457, 455/440, 524

(56) References Cited

U.S. PATENT DOCUMENTS

| | | | | | |
|---|---|---|---|---|---|
| 5,206,901 | A | * | 4/1993 | Harlow et al. | 379/207.07 |
| 5,570,412 | A | * | 10/1996 | LeBlanc | 455/456 |
| 5,724,660 | A | * | 3/1998 | Kauser et al. | 455/456 |
| 5,835,907 | A | * | 11/1998 | Newman | 340/7.5 |
| 5,926,765 | A | * | 7/1999 | Sasaki | 342/450 |
| 5,960,341 | A | * | 9/1999 | LeBlanc et al. | 340/995 |
| 6,091,958 | A | * | 7/2000 | Bergkvist et al. | 455/445 |
| 6,115,596 | A | * | 9/2000 | Raith et al. | 455/404 |
| 6,151,505 | A | * | 11/2000 | Larkins et al. | 455/39 |
| 6,272,347 | B1 | * | 8/2001 | Griffith et al. | 379/265.12 |
| 6,330,452 | B1 | * | 12/2001 | Fattouche et al. | 342/457 |
| 6,400,941 | B1 | * | 6/2002 | Nara | 455/422 |

FOREIGN PATENT DOCUMENTS

JP 09247730 * 9/1997 ............ H04Q/7/20

* cited by examiner

*Primary Examiner*—Thanh Cong Le
*Assistant Examiner*—Stephen D'Agosta

(57) ABSTRACT

The present invention relates to an arrangement in a mobile communications network, including a first Mobile Station, a second Mobile Station, a Base Station device, control means to control the Base station device, and means for positioning the first and second Mobile Station, the first Mobile Station being a seeking Mobile Station and the second Mobile Station being a sought Mobile Station. The arrangement includes a data storing arrangement for storing position data about the first and second activated mobile stations received from the position means, and means to process the position data with respect to the position of the first Mobile Station and provide the first Mobile Station with location information of the second Mobile Station.

23 Claims, 5 Drawing Sheets

METHOD AND ARRANGEMENT RELATING TO MOBILE TELEPHONE COMMUNICATIONS NETWORK

BACKGROUND

The present invention relates to a method and arrangement in mobile telephone communications networks, specially cellular telephone communications networks such as GSM, PDC, DAMPS etc., in which additional services for information exchanges are implemented. The network further includes a first Mobile Station, a second Mobile Station, and means for positioning the Mobile Stations. The first Mobile Station is arranged as a seeking Mobile Station and the second Mobile Station being sought by the first Mobile Station.

The invention also refers to a communications network implementing the invention and a method for carrying out the invention.

The increased number of mobile telephones has resulted in increased accessibility of the persons being subscribers of the communications networks. Nowadays, it is possible to reach practically any subscriber everywhere in the world connected to a well-established, globally connected mobile phone network.

Nevertheless, modem society influences our communication routes in different ways. Even though we have become closer together thanks to modem communication technology, it has also resulted in a more globalized field of work, which means that family members, friends etc., have spread throughout the world.

Locating persons has therefore become a problem to be solved. It is of course possible to call answering services or leave messages to persons whom we want to get in touch with, but there is no automatic reminding system for maintaining contacts with, for example friends.

Furthermore, a globalized company, having employees in many counties may wish to distribute information about the location of the employees, for example to facilitate contacts. Of coarse, one may use the Internet for this purpose. However, access to and through a mobile phone is much easier and also the number of people reachable through telephones usually outnumbers the people connected to Internet.

A communications system specially based on IP (Internet Protocol) is known through the International Patent Application No. WO 98/16045, which describes a computer communication system, in which information about the subscribers is stored in a database. The information includes the subscribers special interests, the network address the subscriber uses, a subscriber's present connection mode etc. The communications network according to this document includes a number of terminals, which are employed by the users of the network to access the network. There is arranged an apparatus for monitoring whether or not a user is connected to the communications network irrespective of the connecting terminal and apparatus for annunciating to a currently connected user, who seeks another user(s), the connection address information, i.e. the network address, relating to the sought users, who are currently connected to the network.

Positioning of mobile terminals is a well-established technique known through several documents, e.g. JP 09-247730, JP 10-185610 and DE-A-197 122 30.

Moreover, U.S. Pat. No. 5,926,765 discloses a cordless telephone that displays the position of a communication partner's cordless telephone during conversation between cordless telephones and that includes a received field level detector that measures the received field level; a memory section that inputs and stores the position at which received field level is first detected and positions subsequently detected; a control section that determines the relative position of a communication partner's cordless telephone by performing a three-point measurement based on the results of detecting received field level three times and on the resulting detected positions, and a display section that displays the measurement result. The positioning is conducted only during an established conversation.

Other systems are known, in which the mobile stations are arranged to position and provide other mobile stations (connected to the service) with position information.

In WO 98/52379 (corresponding to SE 509 435) is disclosed a method of determining the geographic location of a mobile station in, a mobile communications system. The object of the invention is to protect the integrity of the user of the mobile station, so as to prevent the location of the mobile station being established by an outsider against the will of the user. In this respect, an authorization check is carried out in conjunction with a request for determination of the geographical location of a mobile station. The geographical location is only determined when authorization is found for the mobile station to be located. This authorization control involves checking that the user of the mobile station has granted permission for the location of his mobile station MS to be determined on the part of an outsider. The authority check may also include the condition that only certain outsiders may be informed of the geographical location of the mobile station. According to the invention an integrity protection is provided. Information about the position of mobile stations is processed with respect to predetermined parameters determining the further transfer of the information. No processing of information with respect to a second mobile stations location is carried out.

U.S. Pat. No. 5,835,907 teachers a wireless communication device, operating over frequencies allocated to Personal Communications Services (PCS), uses Global Positioning System (GPS) technology to determine the subscriber's exact location on a periodic basis. The device sends the location information to a database for storage and subsequent retrieval by a Geographical Information System (GIS) software application The GIS converts the location in formation represented by a latitude/longitude combination to a "user-friendly" classification of a block, street, city, etc. The classification of the subscribers location is then automatically communicated to emergency services and/or a designated contact, if an emergency button has been activated on the device. The invention does not concern relative positioning of two or more mobile units and information exchange with respect to the position information.

SUMMARY

One objective of the present invention is to present an arrangement in a mobile communications network, which in a simple way provides extended services, preferably to the subscribers of the network preferably through the network. Said extended services comprise, among others, a database including special information about at least some of the subscribers of the mobile communications network.

Another objective of the present invention is to provide the subscribers of the mobile communications network with structured information on other, preferably selected, subscribers of the same or other mobile communications networks. Preferably, the information comprises further data about the position or location of a mobile station (subscriber) and its status. Advantageously, the position information includes the absolute location of a sought mobile station in relation to a seeking mobile station.

Yet another object of the present invention is to reduce the amount of unnecessary and costly traffic. Another objective of the invention is to provide an intelligent address book in a mobile phone, with the possibility to link to a computer, with an automatic update of the book.

An important benefit of the invention is providing a more efficient communication by enabling "pre-communication" status control. Armed with the knowledge of where the person that one wishes to contact is, and the status of their mobile phone, it is possible to place the call at the right time.

Moreover, the invention can be a server-based solution for GSM operators, and helps them to provide the subscribers with information that already exists in their network. Instead of simply transferring information through their networks, operators can generate information that can be useful for their subscribers.

Finally, because the invention can support the Short Message Service (SMS) and Wireless Application Protocol (WAP), as well as the ordinary web interface, end users will be able to use iPulse Locator with the latest Ericsson mobile equipment (like MC 218, R320, and R380) as well as with all existing and future GSM mobile phones. The users can also use an ordinary Internet connection in order to update their list and retrieve information about those on the list.

For this reason the initially mentioned arrangement includes a data storing arrangement for storing position data about said activated first and second mobile station received from said positioning means and means to process said position data with respect to the position of said first Mobile Station and provide said first Mobile Station with location information of said second Mobile Station. Preferably, said position processing is adaptive. The data storing arrangement contains substantially structured lists about the second mobile station and additional mobile stations and corresponding subscribers. The data storing arrangement may comprise a memory unit, a database etc.

To be able to reduce calls the arrangement the arrangement comprises further means for detecting a status of said second Mobile Station. Preferably, said status includes busy/idle and/or connected/disconnected status of the second mobile station. Advantageously, for extended information, said data storing arrangement contains further information about said subscriber's interests, age, friends and relations and medical information.

Preferably, at least selected parts of content of said data storing arrangement are transmitted and displayed on said first Mobile Station. In one preferred embodiment the transmission is carried out when said first Mobile Station is connected to the mobile communications network. However, the transmission may be carried out upon request of a user of said first Mobile Station. For transmission and presentation the mobile stations are provided with one or several of Unstructured Supplementary Subscriber Data (USSD) text displaying, Short Message Service (SMS), General Packet Radio Service (GPRS) for transfer and presentation of the information.

In one preferred implementation, above-mentioned list has a public data section and a private data section.

In one most preferred embodiment, the mobile communications network is a cellular mobile communications network, preferably one of Global System for Mobile Communication (GSM), Personal Digital Cellular (PDC) or Digital Advanced Mobile Telephone Service (DAMPS) or Cellular Digital Packet Data (CDPD). Advantageously, the position of a Mobile Station is determined using external positioning arrangements, Global Positioning Systems (GPS) or GLONASS (Global'naya Navigatsionnaya Sputnikovaya Sistema).

In a GSM or the like network the Mobile Station comprises a Mobile Unit and an identification unit, wherein the identification unit is a Subscriber Identity Module (SIM) and/or Finger Print Unit (FPC) and/or an unique telephone identity.

According to the invention a mobile communication network is presented comprising a Base Station Subsystem controlling radio links with a first and a second Mobile Station, Network Subsystem including Mobile services Switching Center, a Home Location Register and a Visitor Location Register, each Mobile Station comprising a Mobile Unit and a Subscriber Identity Module. The network rafter comprises a data storing arrangement for storing position data about said Mobile Stations received from positioning means and control arrangement to process said position data with respect to the position of said first Mobile Station and provide said first Mobile Station with information on location position of said second Mobile Station. Preferably, the data storing arrangement is arranged in said Network Subsystem and the control arrangement is arranged in the Network Subsystem. In one advantage embodiment, the data storing arrangement is integrated in said Home Location Register or Visitor Location Register. Moreover, the control arrangement is integrated in said Mobile services Switching Center.

To obtain an accurate positioning, the position of a mobile station is determined through locating a connecting base station and/or measuring signal strength and/or time advanced measurement and/or triangulation.

According the invention a method for providing extended information in a mobile communications network, including a first Mobile Station, a second Mobile Station, a Base Station device, control means to control said Base Station device and means for positioning said first and second Mobile Station, said first Mobile Station being a seeking Mobile Station and said second Mobile Station being a sought Mobile Station, comprises the steps of: fetching positions of said first and second mobile stations, processing the positions of said first and second mobile stations, and arranging the positions of said first and second mobile stations with respect to the position of said first Mobile Station in a structured form for presenting the location position of said second Mobile Station.

BRIEF DESCRIPTION OF THE DRAWINGS

In the following the invention will be described in more detail a non-limiting way with reference to the accompanying drawings, in which.

DETAILED DESCRIPTION OF ONE EMBODIMENT

In the following, one embodiment of the invention with reference to a cellular mobile network, specially a Global System for Mobile Communication (GSM) type or network will be described. However, it is obvious for a skilled person that the invention can be implemented in any mobile communications network, for example Personal Digital Cellular (PDC), Digital Advanced Mobile Telephone Service (DAMPS) etc., having suitable means to carry out the invention.

Figure 1:
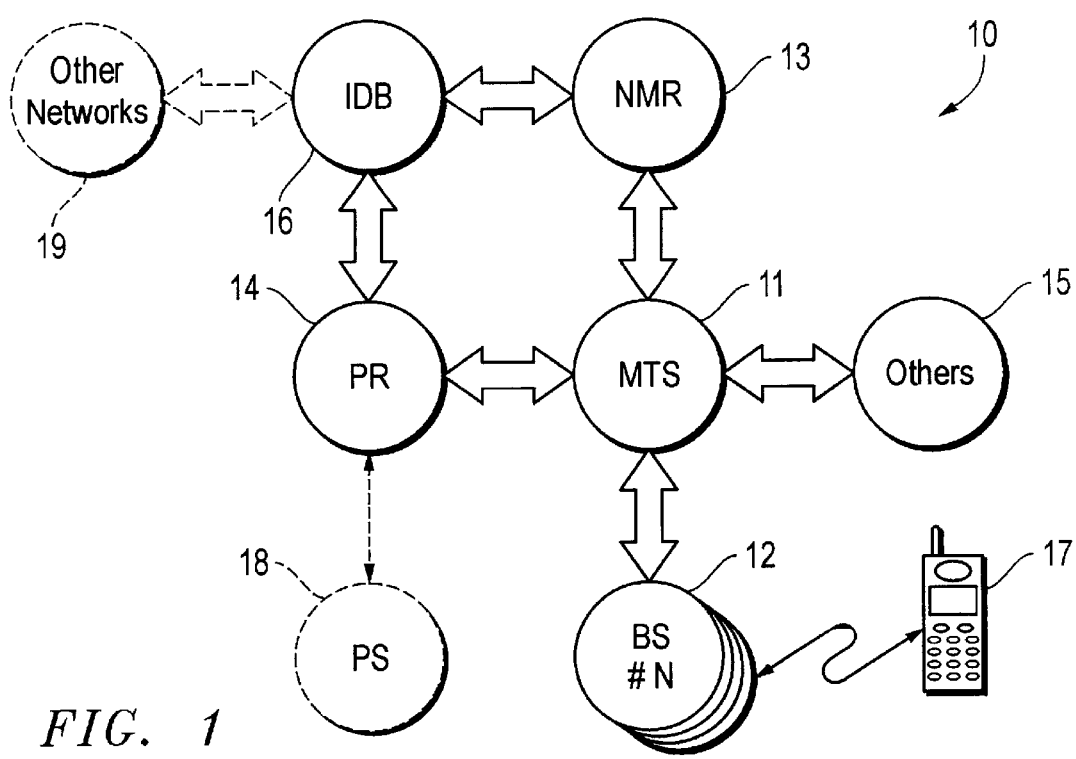
FIG. 1 is a schematic block diagram illustrating the main parts of a communications network, implementing the invention.

According to FIG. 1, a generally illustrated mobile communications network 10, which implements the present invention, comprises a Mobile Telephony Switching arrangement (MTS) 11 communicating with N number of Base Stations (BS) 12 or Base Station Controllers (BSC), Mobile Network Registers (MNR) 13, Position Registers (PR) 14 and other 15 networks, databases, switches etc. The MTS 11 communicates with Mobile Stations (MS) 17 through the BSs 12. The MNR 13 is arranged to communicate with an extended Information Database (IDB) 16, which is implemented in accordance with the invention. A detailed explanation of the IDB will be given later.

Figure 4:
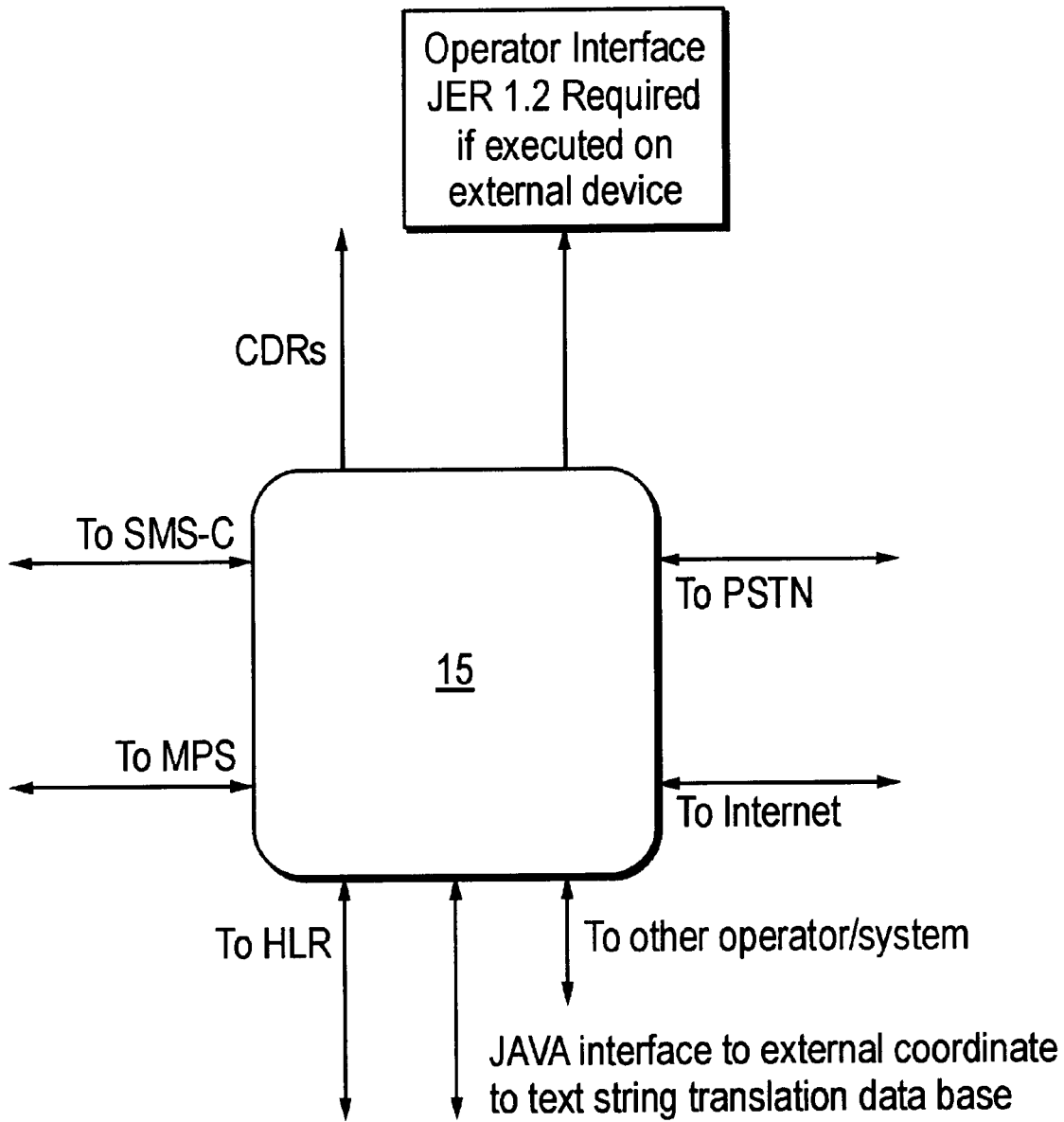
FIG. 4 is a block diagram showing interfaces to the arrangement of the invention.

Preferably, the interface 15, as shown in FIG. 4 can include interfaces to:

CDRs, e.g. through FTP over TCP/IP;—CDR in case no Billing GW: Structured ASCII ASN.1, CDR in case Billing GW, BERL, ISO fixed size, PACKED Fixed size, Fixed or token separated ASCII, Mixed format, Operator interface. e.g. through RMI over TCP/IP, SMS(-C), e.g.: through SEMA; UCP, OIS over TCP/IP and X.25, CMG: UCP over TCP/IP and X.25, ALDI-CSON: SMPP over TCP/IP and X.25, NOKIA: CIMD2 over TCP/IP, EMX: CAP II over TCP/IP, MPS: e.g. through Ericsson: HTTP or HTTPS over TCP/IP, HLR: e.g. through MAP over E1, For triggers: Ericsson enchanced core INAP, Internet: e.g. through TCP/IP, PSTN: e.g. if WAP GW included UDP over IP, CSD Access server, ERICSSON TIGRIS or CISCO RADIUS incl. Calling-Station-Id, Etc.

(CDR: Call Detail Recording, FTP: File Transfer Protocol, TCP/IP: Transmission Control Protocol/Internet Protocol, GW: Gateway, RMI: Remote Method Invocation, OIS: Open Information Systems, SMPP: Short Message Peer to Peer, UDP: User Datagram Protocol, CSD: Coordinated Standards Document, HTTP. HyperText Transport Protocol, PSTN: Public Switched Telephone Network, INAP: Intelligent Network Application Profile, MAP: Mobile Application Part)

It is also possible provide roaming between different networks.

The information on the position of an MS 17 is received through BSs 12 or a Positioning System 18. It is also possible to establish connection with other networks 19, such as Internet, Intranet etc., to access the IDB through an appropriate gateway (not shown) for retrieving or delivering data.

Figure 2:
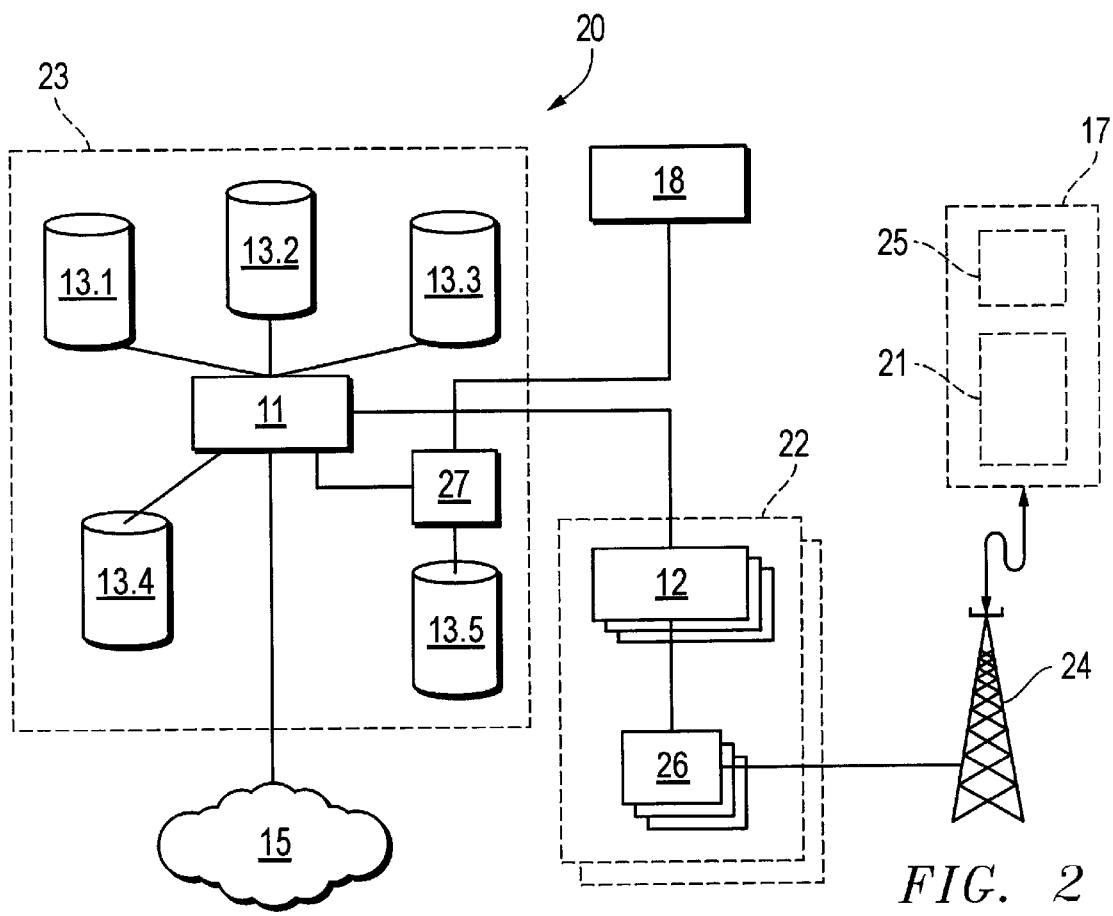
FIG. 2 is a schematic illustration of a GSM network implementing the invention.

The integration of the invention in a GSM network is schematically illustrated in FIG. 2. The GSM network 20 is composed of several functional entities, which can be divided into three main parts. The Mobile Station (MS) 17 is carried by the subscriber. The Base Station Subsystem (BSS) 22 controls the radio link with the MS. The Network Subsystem (NS) 23, the main part of which is the Mobile services Switching Center (MSC) 11, performs the switching of calls between the mobile users, and between mobile and fixed network 15 users, including for example Public Switched Telephone Network (PSTN), Integrated Services Digital Network (ISDN), Packet Switched Public Data Network (PSPDN), Circuit Switched Public Data Network (CSPDN) etc. The MSC 11 also handles the mobility management operations. There are other functional blocks such as Operations and Maintenance Center (not shown), which supervise the proper operation and setup of the network. The MS 17 and the BSS 23 communicate across an air interface or radio link 24. The BSS 22 communicates with the MSC 23 across a cable or radio link, or the like.

The MS consists of the Mobile Unit 21 (the terminal) and a Subscriber Identity Module (SIM) 25. The SIM, generally realized as a smart card, provides personal mobility, so that the user can have access to subscribed services irrespective of a specific terminal. By inserting the SIM card into another GSM terminal, the user is able to receive calls at that terminal, makes calls from that terminal, and receive other subscribed services. Clearly, other identifying arrangements such as a Finger Print Unit (FPU) and/or an unique telephone identity corresponding to a specific handset or a PIN-code activating a special telephone address may also be used individually or in combination.

The MS is uniquely identified by the International Mobile Equipment Identity (IMEI), and stored in the SIM card are: an International Mobile Subscriber Identity (IMST) used to identify the subscriber to the system, a secret key for authentication, and other information. The IMEI and the IMSI are independent, thereby allowing personal mobility. The SIM card may be protected against unauthorized use by a password or personal identity number, etc.

The BSS 22 includes a Base Transceiver Stations (BTS) 26 and Base Station Controllers (BSC) 12. The BTS 26 accommodates radio transceivers that define a cell and handles the radio-link protocols with the MS 17. The BSC 12 manages the radio resources for one or more BTSs, handles radio-channel setup, frequency hopping, and handovers well known for a skilled person.

As mentioned above, the central element of the NS is the MSC 11, which acts as a normal switching node of, e.g. PSTN or ISDN, and additionally provides all the functionality needed to handle the mobile subscriber through services, such as registration, authentication, location updating, handovers, and call routing to a roaming subscriber. A Home Location Register (HLR) 13.1 and Visitor Location Register (VLR) 13.2, together with the MSC, provide the call-routing and roaming capabilities of the GSM network.

In the network, the location of the mobile station is typically in the form of the signaling address of the VLR 13.2 associated with the mobile station. There is logically one HLR 13.1 per GSM network, although it may be implemented as a distributed database. Preferably, the positioning is carried out when the mobile station is in active, i.e. switch on state, which includes idle, busy etc.

The VLR 13.2 contains selected administrative information from the HLR, necessary for call control and provision of the subscribed services, for each mobile currently located in the geographical area controlled by the VLR. The VLR is generally implemented together with the MSC, so that the geographical area controlled by the MSC corresponds to one controlled by the VLR. It is to be noted that the MSC contains no information about particular mobile stations 17 but this information is stored in the location registers.

For authentication and security purposes an Equipment Identity Register (EIR) 13.3 and an Authentication Center (AuC) 13.4 are arranged.

According to the invention NS 23 also includes the IDB 16 and a Controlling Arrangement (CA) 27. The IDB contains extended information about the subscribers preferably as a result of subscribing to the extended services provided by the network or the network operator. The IDB may include information on the subscribers interests, age, friends and relations, medical information (e.g. through online monitoring of a subscriber) on subscribers, status of MS, MS's position etc. The status information substantially includes information on busy/idle, connected/disconnected, technical problems (the battery status, malfunctions etc.) of the mobile unit. Obviously, all or some amount of information can be stored by the permission of the subscriber. Moreover, a "redirection" warning may also be stored in the database for informing the user that the sought subscriber has redirected the line and that the position information is missing or it is not reliable.

The position of the MS is determined through known methods, e.g. by means of locating the connecting base stations and signal strength and/or time advance determinations, using external positioning arrangements 18 and Global Positioning Systems (GPS), GLONASS (Global'naya Navigatsionnaya Sputnikovaya Sistema), etc. In the preferred embodiment, however, the resources of the GSM network, locating the connecting base station, the signal strength measurement, time advanced measurement and/or triangulation (if MS reached from several cells or BSs) are used to locate a MS. However, in a preferred embodiment positioning MSs is performed by, e.g. the network through connecting base stations without any need for setting up a call/conversation (Circuit Switched or any other type of speech connection), i.e., a pre-communication positioning and status retrieval is obtained before initiating a possible call. The Mobile Stations 17 themselves may also be provided with positioning arrangements (e.g. GPS receivers) and communicate their positions to the MSC.

In the GSM network a powered-on MS is informed of an incoming call by a paging message sent over a PAGCH channel of a cell. To avoid complications, GSM cells are grouped into location areas. Then, updating messages are required when moving between location areas, and mobile stations are paged in the cells of their current location area.

The location updating procedures, and subsequent call routing, use the MSC and location registers: the HLR and the VLR. When a mobile station is switched on in a new location area, or it moves to a new location area or different operator's Public Land Mobile Network (PLMN), it must register with the network to indicate its current location. In the normal case, a location update message is sent to the new MSC/VLR, which records the location area information and then sends the location information to the subscriber's HLR, which may then pass the information to IDB or propagate it to other networks to update IDBs if provided with this functionality.

For reliability reasons, GSM also has a periodic location updating procedure. In view of the present invention, the location updating procedure is of course extended to be carried out in more detailed and accurate positioning than merely indicating a relevant base station. If a HLR or MSC/VLR fails, updating each mobile register simultaneously in the database would cause overloading. Therefore, the database is updated according to GSM standard as location updating events occur. More detailed positioning may be carried out on demand. The enabling of periodic updating, and the time period between periodic updates, is controlled by the operator, and is a trade-off between signalling traffic and speed of recovery. If a mobile unit does not register after the updating time period, it is deregistered (and removed from the database).

A procedure related to location updating is the IMSI "attach" and "detach". A detach lets the network know that the mobile station is unreachable, and avoids having to needlessly allocate channels and send paging messages. An attach is similar to a location update, and informs the system that the mobile is reachable again. The operator handles the activation of IMSI attach/detach, preferably on an individual cell basis.

Since the radio medium can be accessed by anyone, authentication of users is a very important part of the mobile communications network. Authentication is carried out by means of the SIM card and by means of the AuC 13.4. Each subscriber is given a secret key, one copy of which is stored in the SIM card and the other in the AuC. The authentication is carried out in a manner well known for a skilled person and not detailed here.

The result of the registration and authentication, i.e. a positive result, is that the subscriber is connected which is announced to the IDB, in which the subscriber is indicated idle (or busy).

The position and the status information are preferably supplied via control channels of the GSM.

In one embodiment, the IDB 16 contains a list for each subscriber (prepared, e.g., by CA 27), a so-called "Buddy-list". Each Buddy-list contains selected information on the subscribers being selected as members of a particular subscriber's (client's) buddy-list (obviously, with permission of the subscriber and in view of the information provided by the subscribers).

Preferably, the network is arranged to update the buddy-list, for example by pulling the position information and status information of subscribers using IMSI.

The CA 27 may be arranged to provide the database with further data depending on the determined location, e.g. time-zone, day and night information, the country, the region etc. Assuming that the subscriber A seeks information on subscriber B the position processing is carried out according to the following. The position processing procedure compares position data, incoming from and/or stored on, A and B, and then based on the result of comparison and further information, e.g. stored in a database, a suitable location presentation is produced and transmitted to A's Mobile Station to be displayed. The processing may be adaptive, i.e. the data is processed and categorized in levels, e.g. divided into "COUNTRY", "CITY", "PLACE" and so on. If A is in Sweden, for example, and B in France, the location is given as "FRANCE", if A is in France, then location is indicated, e.g. by "PARIS", and if A is in Paris the location may be indicated by a street name, e.g. "Place de la Concorde" or the like. Although, the "location" is the preferred representation form, it is clear that a more precise position of the sought subscriber can be provided. In one embodiment, it is also possible to set a sensitivity threshold for presenting distances between the MSs. It is also possible to provide graphical presentations through maps (Map on Web), WAP data, browser suited data, etc.

Another aspect of location information function is that, it may reduce the number of costly long distance calls as a caller is conscious about the distance to the counterpart. Obviously, supplementary information on call charges may also be provided.

Although, the IDB 16 is described and illustrated as an external database, it may be implemented as part of HLR or VLR and the CA 27 can be integrated in MSC.

The implementation of the invention in a network requires enhancement of the mobile unit functionality. In the simplest form, the mobile units are provided with the Unstructured Supplementary Subscriber Data (USSD) text display for presentation of information, i.e., the buddy-list. In one embodiment, the positioning and status information are transmitted, preferably depending on MS type, by means of USSD, Short Message Service (SMS), General Packet Radio Service (GPRS), Wireless Application Protocol (WAP) etc. WAP requires a full-duplex datagram service from the bearer network and GSM USSD does not provide such a service. Instead, GSM USSD provides a two-way-alternate interactive service designed to convey short text strings between the mobile phone and a node in the GSM network. Therefore, the use of protocols may depend on the communications network implementing the invention and the Mobile Station type.

The application protocol between the network operator and the client handles:

Server and a number of clients, where the server is the owner of the buddy-list. The headings and outline of the list can be user defined.

Updating clients, preferably when they are online. If a connection is lost, then notification is sent via, e.g. icons to user at update time. Updates may he executed at client activation and at user request, The buddy-list status alert (if enabled for any person on the list).

Location, mobile station status, and other functions, such as Quickmails (Unified messages, i.e. voice or text or quick messages), and status of Quickmail (receipt for the addressee reading a message).

Further information (part of the public data) on "buddies", e.g. applications (for example through a URL link) a "buddy" uses to make it easy to access and initiate an application of his/her.

The possibility to disable each information item.

The possibility to alter information.

The location accuracy depending on the relative distance as described above.

Security, to ensure the source of a mail as reliable.

Connection to other extended service operators.

Connection to other systems such as ICQ (provided by Mirabilis Corp.).

The possibility for clients to use EPOC PDA (Personal Digital Assistant), new types of Mobile Stations, CE PDA, WAP phone or PDAs integrated in the MSs.

Enabling the user to define public data. Preferably, the user-defined data is of two categories: Push data and data on request. The user is able to select the category of some data. By push data is meant the network updating a mobile unit with data and data on request applies to the client's request for update.

Command to initiate other channels with higher speed for this purpose.

Additional notification if other subscribers have added a user to his/her buddy list and possibility to Accept or Reject the insertion.

Possibility of having a list of persons who are always accepted/rejected before attempting to insert another subscriber.

In the preferred embodiment, the communication between the MSC and client is performed by text messages containing tags and strings. In this case, each message consists of a Mobile Subscriber ISDN number (MSISDN) and an operation. The interface is hence suitable for USSD/SMS terminals as well as Personal Digital Assistants (PDA).

Figure 3:
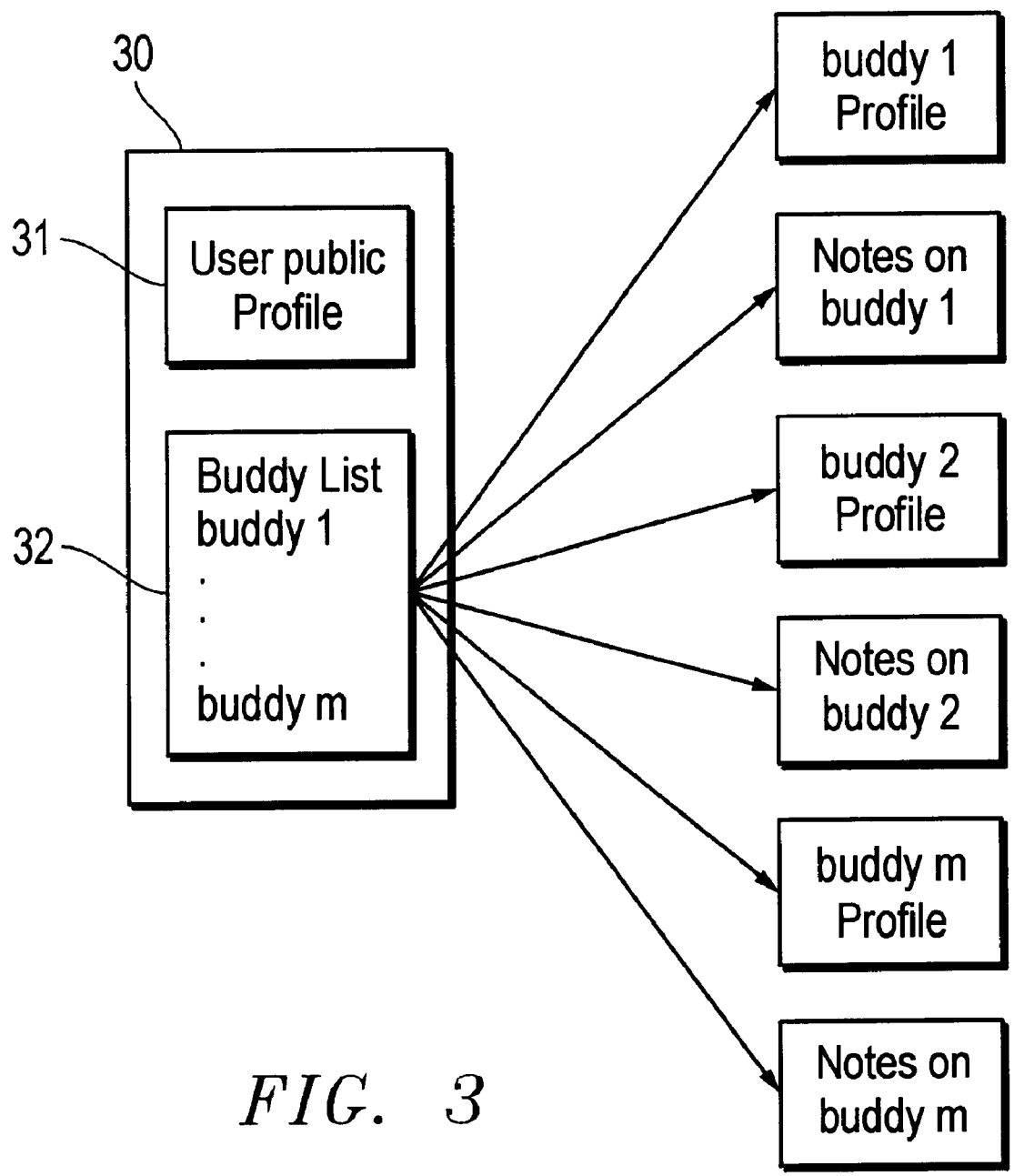
FIG. 3 is a schematic block diagram over a data structure according to the present invention.

FIG. 3 shows an implementation of a "buddy-list", which has: "Buddies", i.e. subscribers to be watched in a specific order. The buddy-structure 30 has public data 31, e.g. available for all subscribers and private personal data 32, e.g. notes about the persons in the buddy list.

Public data may include Nick Names, MSISDN, Icons (Sound/Text/Picture), Location, Location Status, Phone Status, Email Address, ICQ No., greetings, personal data such as name, work, education, references, sex, interest, age, length, weight, hair/eye colour, address, work details, home page, community, user-defined-items, for example part of visiting card, etc. Of course the majority of the entries are not mandatory.

The private data for the owner of the buddy list may include: Category Attribute (Close friends, Closed friends, Friends, Colleagues), History (Sent and received messages with time stamp), Sent Quickmails (Convertible to email), private note on the buddy (data which are not public and may not be known by the person), etc.

The user can control: the settings, which show location, show telephone status, other application settings, terminal type, and other public and non-public data as a buddy.

Figure 5:
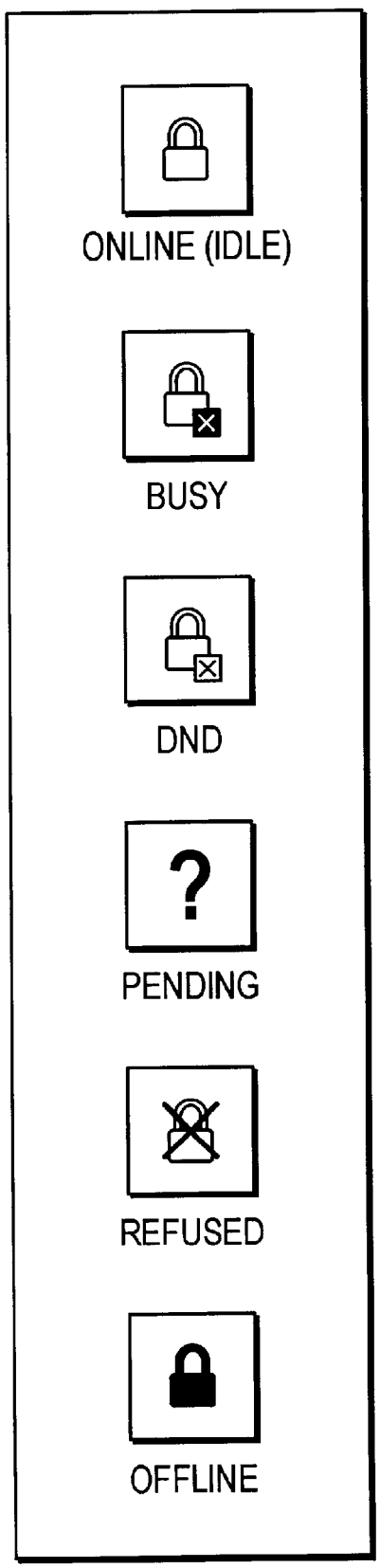
FIG. 5 shows an image of a web browser interface.
Figure 5:
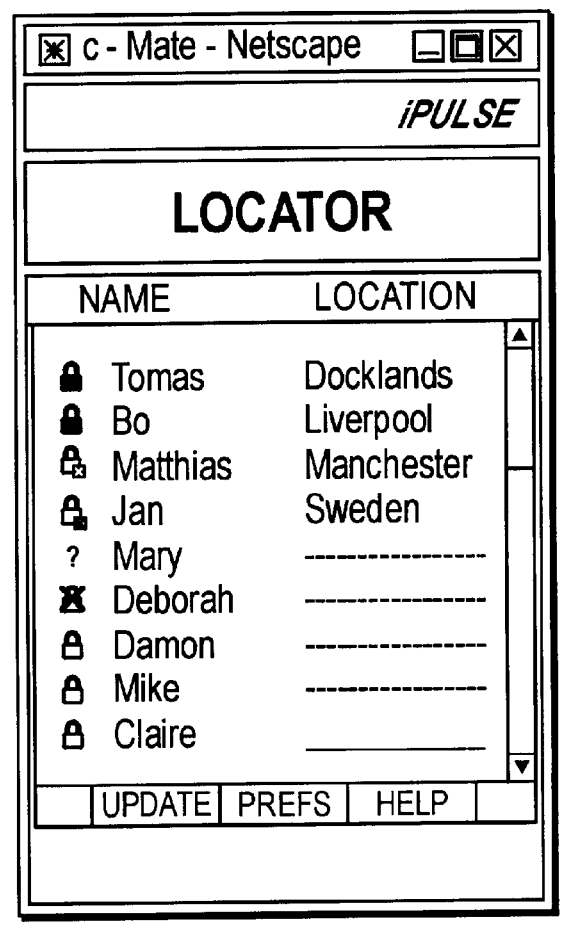

It is also possible to access the application via a normal web browser on any type of Internet connection. As shown in FIG. 5 the browser can provide information by means of simple icons.

Figure 6:
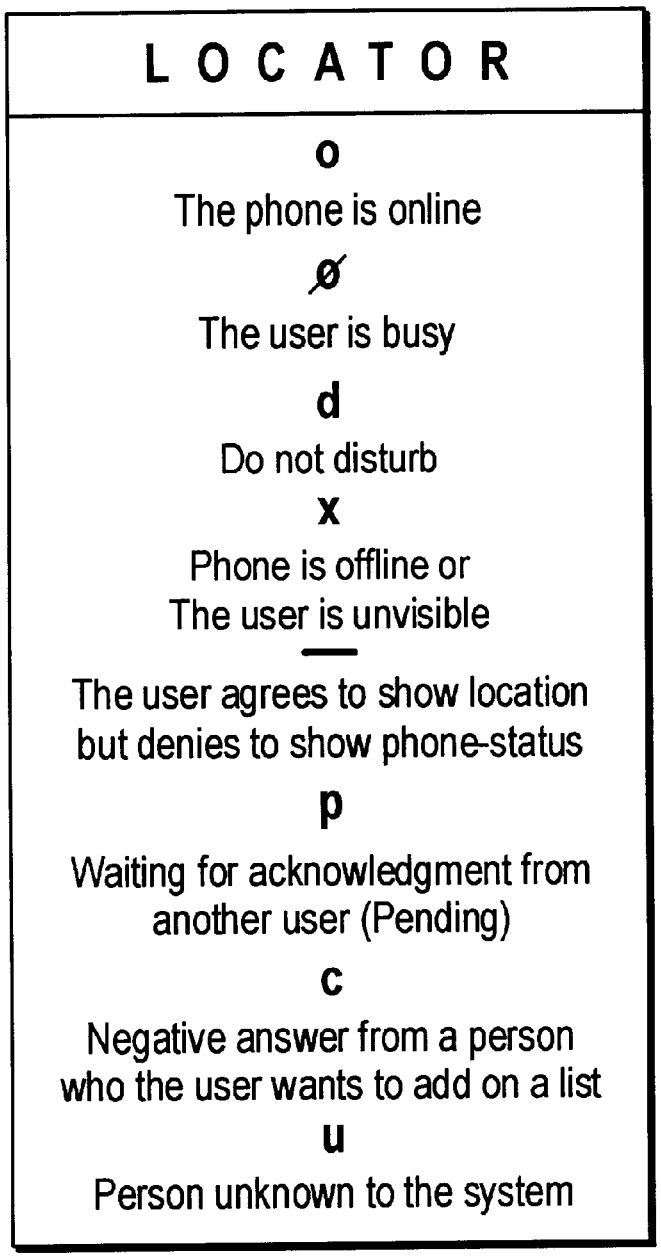
FIG. 6 shows an image of mobile phone implementing the invention.
Figure 6:
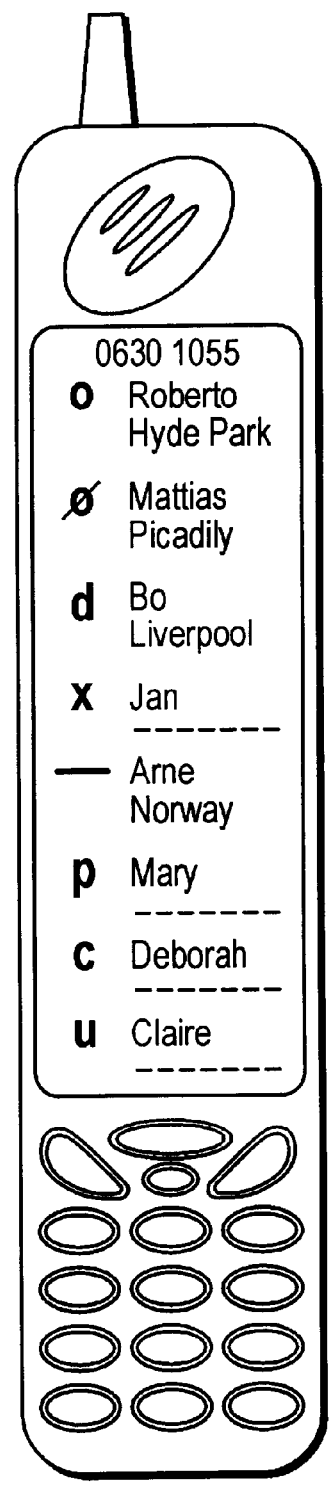

Preferably, all types of GSM mobile phones that can handle SMS can be used for providing information retrieved through the application of the invention. In addition, WAP-enabled GSM mobile phones can offer a better user interface and easier access to different functions. To reduce the information representation, signs can be used as illustrated in FIG. 6.

The invention is not limited to the shown and described embodiment but can be varied in a number of ways without departing from the scope of the appended claims and the arrangement and the method can be implemented in various ways depending on application, functional units, needs and requirements etc.

What is claimed is:

1. An arrangement in a first mobile communications network communicating with a first mobile station and a second mobile communications network, comprising:

Positioning means for positioning a plurality of second mobile stations wherein at least one of said plurality of second mobile stations is located outside of said first mobile communications network and serviced by said second communications network;

A data storing arrangement for storing first data identifying said first mobile station wherein said data storing arrangement further storing second data associating first mobile station with said plurality of second mobile stations, Wherein said data storing arrangement further storing position data associated with each of said second mobile stations wherein said position data for each of said plurality of second mobile stations are determined by said positioning means without establishing a call connection between said first mobile station and said second plurality of second mobile stations; and Means for communicating said stored position data associated with said plurality of second mobile stations to said first mobile station.

2. An arrangement according to claim 1, wherein the position processing is carried out in different levels.

3. An arrangement according to claim 1, wherein the data storage arrangement further stores position data associated with said first mobile station and communicates said position data associated with said plurality of second mobile stations in respect to said stored position data associated with the first mobile station.

4. An arrangement according to claim 1, further comprising means for detecting a status of a particular one said second mobile stations.

5. An arrangement according to claim 4, wherein the status includes busy/idle and connected/disconnected.

6. An arrangement according to claim 4, wherein the data storage arrangement contains additional information about the subscriber's interests, age, friends and relations and medical information associated with said first mobile station.

7. An arrangement according to claim 1, wherein at least selected parts of content of the data storage arrangement are transmitted and displayed on the first Mobile Station.

8. An arrangement according to claim 7, wherein the communication is carried out when the first Mobile Station is connected to the mobile communications network.

9. An arrangement according to claim 8, wherein the communication is carried out upon request of a user of the first Mobile Station.

10. An arrangement according to claim 7, wherein said communications is provided by at least one of the following protocols:

Unstructured Supplementary Subscriber Data (USED) text displaying;

Short Message Service (SMS);

General Packet Radio Service (GPRS); or

Wireless Application Protocol (WAP) for transfer and presentation of information.

11. An arrangement according to claim 10, wherein the protocol is selected based on the type of first Mobile Station.

12. An arrangement according to claim 6, wherein said additional data has a public data section and a private data section.

13. An arrangement according to claim 1, wherein the information is presented through a graphical interface.

14. An arrangement according to claim 1, wherein the positioning is performed in a pre-connection step of the Mobile Stations.

15. A mobile communication network including a first mobile station and one or more second mobile stations, each of said mobile stations further including a mobile unit and a subscriber identity module comprising:

A Base Station Subsystem controlling radio links with said first mobile station;

A network subsystem including Mobile services Switching Center, a Home Location Register and a Visitor Location Register A Data storing arrangement communicably coupled to said Mobile Services Switching Center for storing first data identifying said first mobile station, wherein said first data further including correlation data correlating said first mobile station with said one or more second mobile stations Wherein said data storing arrangement further storing position data associated with each of said second mobile stations wherein said position data are determined without establishing a call connection between said first mobile station and said second mobile stations and wherein at least one of said second mobile stations is located outside of service area associated with said Network Subsystem; and Wherein said data storing arrangement further communicates said position data associated with said second mobile stations to said first mobile station by transmitting over said radio links controlled by said Base Station Subsystem.

16. A mobile communication network according to claim 15, wherein the data storing arrangement is integrated in a Home Location Register or a Visitor Location Register serving said first mobile station.

17. A mobile communication network according to claim 15, wherein the position of a mobile station is determined through locating a connecting base and/or measuring signal strength and/or time advanced measurement and/or triangulation.

18. A mobile communication network according to claim 15, wherein the position of a mobile station is determined using external positioning arrangements selected from Global Positioning Systems (GPS), or GLONASS (Global'naya Navigatsionnaya Sputnikovaya Sistema).

19. A method for providing extended information in a mobile communications network, including a first mobile station, and a plurality of second mobile stations, the method comprising the steps of:

Storing identification data representing said plurality of second mobile stations and further correlating said plurality of second mobile stations with said first mobile station Determining the positions of said second mobile stations wherein said determination is performed without establishing a call connection between said first and second mobile stations and wherein aid first mobile station is serviced by a first mobile switch and at least one of said second mobile stations is serviced by a second mobile switch Storing said determined position data associated with said plurality of second mobile stations Communicating said determined position data to said first mobile station.

20. The method of claim 19 further comprising the steps of:

determining the position data associated with said first mobile station; and communicating said positions of said first and second mobile stations wherein the position data associated with said second mobile stations are arranged with respect to the position of said first mobile station.

21. The method of claim 19 further comprising the steps of:

determining the status of said plurality of second mobile stations; and communicating said status information to said first mobile station.

22. The status of said claim 21 includes busy/idle and connected/disconnected.

23. The arrangement of claim 1 wherein said first mobile communications network is a first base station subsystem and said second mobile communications network is a second base station subsystem.

* * * * *